(12) United States Patent
Derhak et al.

(10) Patent No.: US 6,344,903 B1
(45) Date of Patent: Feb. 5, 2002

(54) SYSTEM AND METHOD FOR MULTI-LEVEL PROCESSING WITH LEVEL LIMITING

(75) Inventors: Maxim Wasyl Derhak; Bobby Dee Hartley, both of West Jordan, UT (US)

(73) Assignee: Onyx Graphics Corporation, Midvale, UT (US)

( * ) Notice: Subject to any disclaimer, the term of this patent is extended or adjusted under 35 U.S.C. 154(b) by 0 days.

(21) Appl. No.: 09/414,392

(22) Filed: Oct. 7, 1999

(51) Int. Cl.[7] ................................................. H04N 1/40
(52) U.S. Cl. ...................... 358/1.9; 358/456; 358/534; 382/252
(58) Field of Search .................... 358/1.9, 455, 456, 358/298, 534; 382/251, 252

(56) References Cited

U.S. PATENT DOCUMENTS

| | | | | |
|---|---|---|---|---|
| 5,175,804 A | | 12/1992 | Wittmann | 395/108 |
| 5,519,815 A | * | 5/1996 | Klassen | 358/1.9 |
| 5,563,985 A | * | 10/1996 | Klassen et al. | 358/1.9 |
| 5,796,929 A | * | 8/1998 | Shu et al. | 358/1.9 |
| 5,799,136 A | * | 8/1998 | Li et al. | 358/1.9 |
| 5,841,951 A | * | 11/1998 | Shu et al. | 358/1.9 |
| 5,872,896 A | * | 2/1999 | Li et al. | 358/1.9 |
| 6,068,361 A | * | 5/2000 | Manell | 358/298 |

OTHER PUBLICATIONS

Fredrik Nilsson, "Precomputed Frequency Modulated Halftoning Maps that Meets the Continuity Criterion," IS&T's NIP12:International Conference on Digital Printing Technologies, Oct. 27–Nov. 1, 1996, pp. 72–77.

* cited by examiner

Primary Examiner—Thomas D. Lee
(74) Attorney, Agent, or Firm—Workman, Nydegger & Seeley

(57) ABSTRACT

A method for color image reproduction that includes an image that is defined by a plurality of pixels. A first array of digital values representing the density and placement of the continuous tone colors contained in each pixel of said image is generated. The first array of digital values is processed so as to derive a separate array of digital multi-level color values representing the density and placement of each color for each of the pixels in the image. The processing generates levels and percentage of ink placements for each level change. In one embodiment, the level and percentage of placement within a level change for each of the pixels is derived using an error diffusion method. The error diffusion method includes digitally processing a separate entry array for each multi-level color value so that for each pixel a separate error diffusion array is generated for a plurality of surrounding pixels. The calculations continue on each error diffusion array so as to assign a weight value to each of the plurality of surrounding pixels. The weight values are dependent upon the relative position of said surrounding pixels of which the error diffusion array was determined. The error diffusion processing use the weight values and the error diffusion array to calculate an output array for each pixel that defines the level and the background of a corresponding pixel. In an alternate embodiment, the separate array of digital values representing the density and placement of each multi-level color value for each of the pixels in the image are processed using a half-tone threshold array to create an output array for each pixel which defines the levels and background level. In addition, in one embodiment, the inventive method is capable of limiting the number of sublevels that will be printed thereby allowing the user to control the output, including the amount of ink that is placed on the media. An output array is then produced for each of the colors in the color image.

19 Claims, 10 Drawing Sheets

SYSTEM AND METHOD FOR MULTI-LEVEL PROCESSING WITH LEVEL LIMITING

BACKGROUND OF THE INVENTION

1. The Field of the Invention

The present invention relates to image reproduction systems and methods, and in particular, to a system and method for color image reproduction that utilizes a multi-level process with level limiting capabilities using a digital computing system.

2. The Relevant Technology

The colors seen in reproductions contained in most magazines, newspapers, colored brochures, and the like are typically created from an optical illusion which results from a process called "half-toning." In these publications, a color image is reproduced from a continuous-tone original such as a color print, a 35 mm slide, or other film transparency. The majority of output devices, such as printers and plotters, however, cannot reproduce a continuous range of color. With rare exception, computer printers and printing presses simply reproduce either total color tone or nothing. Consequently, the way that the majority of printers or other output devices print variable, continuous ranges of color tone is through the use of half-tone dots to create the impression of various colors. For example, a gray tone can be created by putting a black ink in a pattern of tiny dots and letting the white of the paper show through and mix with the black dots to create an impression of gray. Rendering an image into these dots is called half-toning.

The continuous range of colors seen in most magazines and other color publications is reproduced using half-toning. Conventionally, there are four standard printing ink colors, often referred to as "process colors," that have been used in the half-toning process. The four process colors are cyan, magenta, yellow, and black, and are often referred to as "CMYK," where the K stands for black. Together with the background of white paper, the half-tone dots created using these process colors can be used to produce an infinite variety of shades and color tones. Other types of process color schemes have been developed including RGB (red, green, blue), CMY, CMYKOG, and CMYK and any number of spots.

Color image reproductions are typically prepared using separate color prints or plates for each of the process colors. Thus, in order to print a color image it must typically be separated into four half-tone images, one for each of the standard process colors. Electronic separation systems are available which analyze the color content of a digitalized image and separate the image into its constituent process colors. The result of the separation process is four separate prints or films. Once the color separation prints or films have been prepared, they are then utilized to prepare composite color image reproductions.

The degree of sharpness or resolution of the color reproduction prepared by half-toning is a function of a variety of factors. One factor is the screen density or number of dots per linear inch which is used. The human eye can effectively blend half-tone dots with a high degree of resolution at screen densities 130–150 dots per linear inch (dpi). Lower resolution color image productions are also commonly utilized based on screen densities of 85–100 dpi, as for example in many color photographs and charts reproduced in the newspapers.

The quality of a color image reproduction is determined by the degree of resolution or the sharpness of the reproduced images as well as how faithfully the reproduced image corresponds to color in the original image. This in turn means that the quality of the separation is of primary concern. Not only must the color of the various color separation prints or films be faithfully reproduced, but the alignment of the various separation prints is a critical factor. Furthermore, the manner in which the half-tone dots of each of the color separation prints are prepared can also dramatically affect how faithfully the original colors are reproduced as well as the clarity or sharpness of the image. For example, the color density of a particular color is controlled in existing half-toning processes by increasing the size of the dots. The half-tone dots are maintained in a fixed pattern so that they are equally spaced, however, the size of the half-tone dots will be varied in order to selectively increase or decrease the density of a particular color.

A common problem with existing half-toning processes is the over-saturation of the media by the ink. This may result in the ink soaking through the paper, or, worse, running along the paper surface. Another problem that has arisen with existing half tone processes is that there are typically only two levels or types of outputs for each dot in each of the color image. The dot was either on or off. Attempts to resolve some of the above problems included incorporating the use of a modified error diffusion calculation to determine when and where to print a fixed sized dot. This method, however, was only able to determine if the printed dot should be on or off. Thus, even this method was unable to handle multiple levels and stages. As a result, the clarity of the image suffered, dark spots appeared on the reproductions, and the ink saturated the media or, worse, even ran. Further, because the user did not have the ability to control the amount of ink output, the high resolution images required significant processing time as well as printing time.

What is needed in the art is a system and method of color image reproduction which has the ability to convert continuous tone data into multi-tone data and to handle multiple levels of output. There is also a need for a system and method of color image reproduction which eliminates the dark spots and shadows in the image, reduces over-saturation and ink problems. A system and method of color image reproduction is also needed that can be used to reduce the required printing time but still produce high resolution reproductions.

OBJECTS AND SUMMARY OF THE INVENTION

It is an object of the present invention to provide a system and method for color image reproduction utilizing a digital computing system capable of producing multi-level color values as output data.

It is another object of the present invention to provide a system and method for color image reproduction which is capable of generating multi-level color values which can be assigned to digital half tone values.

Another object of the present invention is to generate multi-level color values as output data for each pixel of an image.

Yet another object of the present invention is to provide a method capable of allowing the user to limit the amount of ink that is output by an output device thereby eliminating over-saturation and ink loss.

A further object of the present invention is to provide a method that is capable of handling multiple levels of output.

A further object of the present invention is to provide a method in which the user may specify the number of levels and sublevels depending on the capabilities of a particular printer.

Another object of the present invention is to provide a method of image reproduction that can be used to reduce the time to print an image.

These and other objects and features of the present invention will become more fully apparent from the following description and appended claims, or may be learned by the practice of the invention as set forth hereinafter.

To achieve the foregoing objects, and in accordance with the invention as embodied and broadly described herein, a method for color image reproduction is provided that includes inputting an image that is defined by a plurality of pixels. A first array of digital values representing the density and placement of the continuous tone colors contained in each pixel of said image is generated. The first array of digital values is processed so as to derive a separate array of digital multi-level color values representing the density and placement of each color for each of the pixels in the image. The processing generates levels and percentage of ink placements for each level change. In one embodiment, the level and percentage of placement within a level change for each of the pixels is derived using an error diffusion method. The error diffusion method includes digitally processing a separate entry array for each multi-level color value so that for each pixel a separate error diffusion array is generated for a plurality of surrounding pixels. The calculations continue on each error diffusion array so as to assign a weight value to each of the plurality of surrounding pixels. The weight values are dependent upon the relative position of said surrounding pixels of which the error diffusion array was determined. The error diffusion processing use the weight values and the error diffusion array to calculate an output array for each pixel that defines the level and the background of a corresponding pixel. In an alternate embodiment, the separate arrays of digital values representing the density and placement of each multi-level color value for each of the pixels in the image are processed using a half-tone threshold arrays to create an output array for each pixel which defines the levels and background level.

In addition, in one embodiment, the inventive method is capable of limiting the number of sublevels that will be printed thereby allowing the user to control the output, including the amount of ink that is placed on the media. An output array is then produced for each of the colors in the color image.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is a system and process for image reproduction, particularly color images, that has been developed to process image data into multi-levels with level limiting capabilities. The inventive method and process is capable of manipulating the image data by assigning a dot at a specific pixel to a level and to control the output or amount of ink that is deposited on a media when reproducing the color image. In particular, the present invention involves a system and process for converting continuous tone values in the input file of the color image into half tone values that are assigned to any desired number of levels, each being subdivided into multiple sublevels. In the most simple terms, the inventive process involves taking the values representing colors and manipulating them into levels and sublevels within each level to create an output file telling the printer where and how to print the dots and the amount of ink to place for the dot.

The present invention is described in terms of diagrams and flow charts. Using the diagrams and flow charts in this manner to present the invention should not, however, be construed as limiting its scope.

The embodiments of the present invention may comprise a special purpose or general purpose computer comprising various computer hardware. Other embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk, storage or other magnetic storage devices, or any other medium which can be used to store the desired executable instructions or data structures and which can be accessed by a general purpose or special purpose computer.

When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Figure 1:
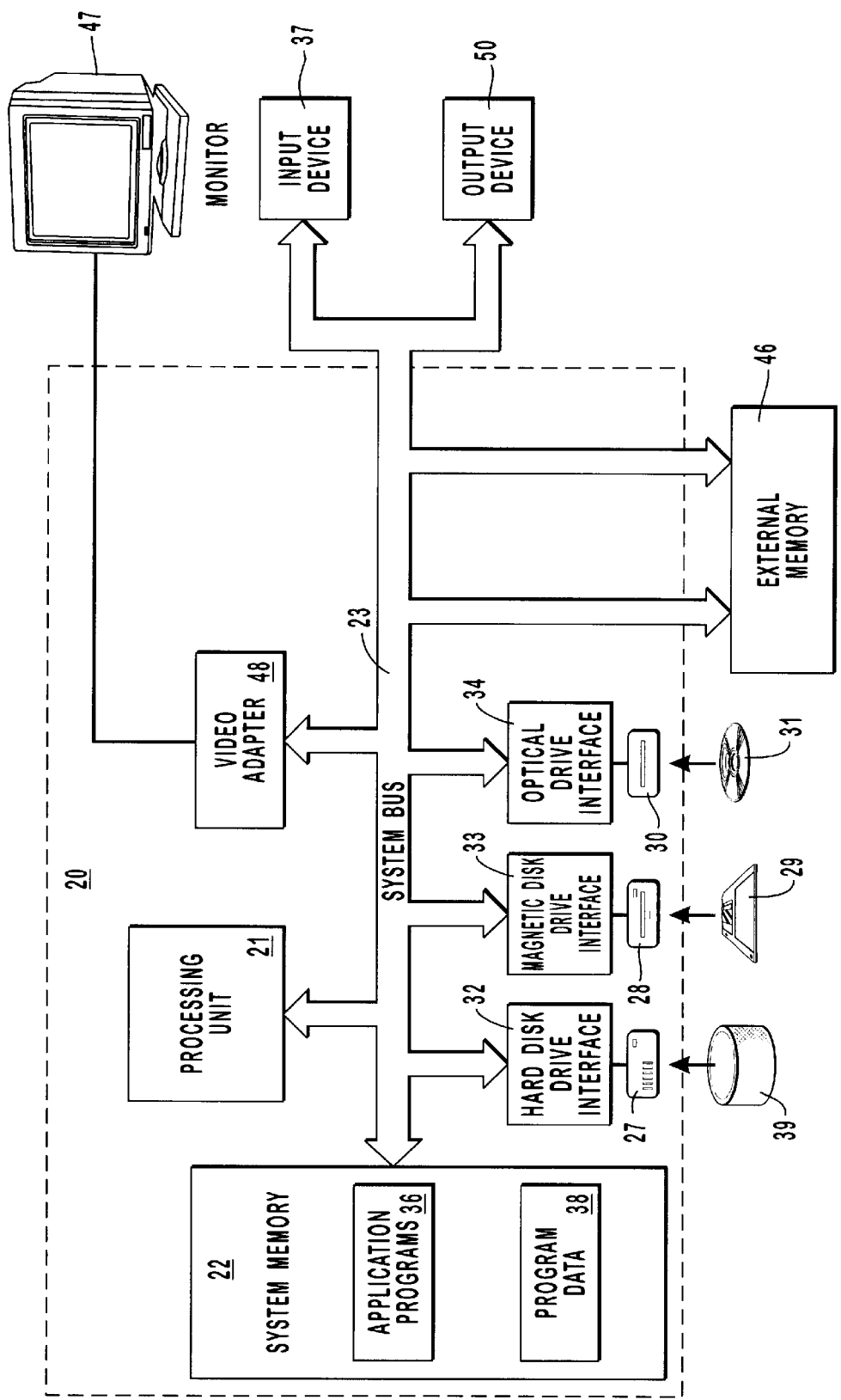
FIG. 1 is an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, or the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including system memory 22 to the processing unit 21. The system bus 23 may be any of several types of bus structures including a memory bus or memory controller, a peripheral bus, and a local bus using any of a variety of bus architectures. System memory 22 includes read only memory (ROM) 24 and random access memory (RAM) 25.

Computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. Magnetic hard disk drive 27, magnetic disk drive 28, and optical disk drive 30 are connected to system bus 23 by a hard disk drive interface 32, a magnetic disk drive-interface 33, and an optical drive interface 34, respectively. The drives and their associated computer-readable media provide nonvolatile storage of computer readable instructions, data structures, program modules an other data for computer 20. Although the exemplary environment described herein employs a magnetic hard disk 39, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A user may enter commands and information into computer 20 through input devices 37 such as a keyboard and pointing device such as a mouse. Other input devices 37 may include a digital camera, a facsimile, a scanner, or the like. These and other input devices are often connected to the processing unit 21 through a serial port interface that is coupled to system bus 23, but may be connected by other interfaces, such as a parallel port, game port or a universal serial bus (USB) port. A monitor 40 or other type of display device is also connected to system bus 23 via an interface, such as video adapter 48. In addition to the monitor, personal computers typically include an output device 50, such as a printing device. Output device 50 may have various other embodiments including plotters, image setter, and laser format printers. Output device 50 may be capable of multiple types of output.

Computer 20 may operate in a networked environment using logical connections to one or more remote computers. The remote computer may be another personal computer, a server, a router, a network PC, a peer device or other common network node, and typically includes many or all of the elements described above relative to computer 20. As illustrated, computer 20 also comprises external memory 46 which is intended to be representative of other resources available to computer 20. Those resources may include, but are not limited to local area networks and remote storage, wide area networks including the Internet, and intranets. Application programs 36 may be resident on either computer 20 or in external memory 46.

Figure 2:
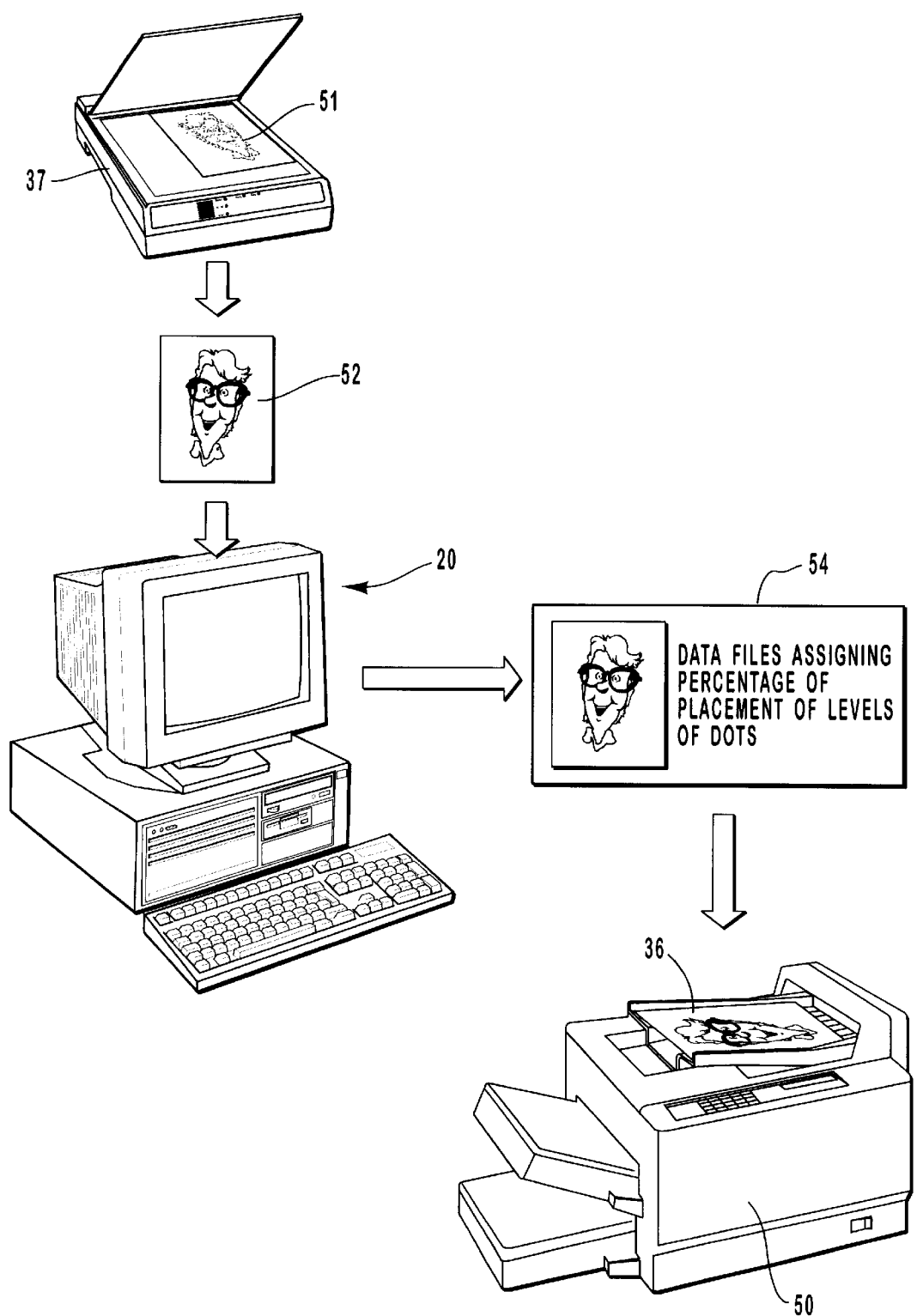
FIG. 2 is a schematic diagram giving an overview of the color image reproduction process in accordance with the system and method of the present invention.

One embodiment of the overall color image reproduction process of the present invention is schematically illustrated in FIG. 2. In general terms an image source, such as input device 37, creates an image file 52 which is then input into computer 20. As illustrated, a composite image 51, by way of example and not limitation, such as a color image is digitalized so as to prepare digital data for image file 52 which contains information corresponding to the intensity and placement each of the colors contained in the image. Image 51 can be digitalized by input device 37 which may include, by way of example and not limitation, a conventional scanner or digital camera. Input device 37 defines image 51 in terms of a plurality of pixels. Each pixel is represented by an x-y coordinate position and an array of digital values A[i, j] is prepared such that each value A in the array represents the density and placement of one of the colors scanned from image 51 at each pixel.

Alternatively, image 51 might be input from a generated color source. By way of example and not limitation, an art package may be used to draw image 51 or can be used to create image 51 with specific characteristics. It will be appreciated by those skilled in the art that the image source may create image 51 using either raster (scanned) data or vector (graphic) data. It is intended that either type of data may be utilized in the present invention. In other words, any type of image 51 that is created by a charged coupled device (CCD) may be used in the present invention. In the instances that image 51 is composed of graphic data, one skilled in the art will appreciate that the graphic data must be rasterized and then digitalized image file 52 is input to computer 20.

In this manner, a digital file is prepared which can be electronically recorded and input as schematically illustrated at 52 to computer 20. The digital data that is prepared and input into processing unit 21 (FIG. 2) of computer 20 is limited only by any size limitations of the particular input device 37 or the size limitations imposed by the computer software running computer 20. The digital data input into processing unit 21 of computer 20 can then be stored in the memory of processing unit 21 or in any of the other storage devices or media previously discussed. As previously mentioned, various types of input devices 37, such as a scanner, a camera or a graphics editor, can be used to prepare the digital file that is input into the processing unit 21. Further, the digitalized file may be received from, for example, other computers on a network system, from other networks or computers, or even downloaded off the Internet. The digitized file typically consists of a digital RGB (red, green, blue) file containing information corresponding to the density and placement of the RGB colors in each pixel of the image. It will be appreciated by those skilled in the art that the digitized file could consist of data in other formats such as CMYK, CMYK orange or green, hi-fi colors, or the like. The present invention is equally effective with other types of data formats than the digitalized RGB file specifically mentioned herein.

Once image file 52 has been input into processing unit 21 of computer 20, the data is then digitally processed by processing unit 21 to convert the data into the processing colors and to derive from the data files for each of the colors, the data files assigning the percentage of placement of levels of dots are created as depicted at 54. Processing colors may be, by way of example and not limitation, RGB, CMYK, spot colors, and black and white color separations.

As used herein and discussed in additional detail below, the term "level" is defined to mean the different types of output, such as double striking, different colors, or color intensity output by an output device, such as printer 50. The change from one level to another is referred to as a "level change." Each level change is still divided into a number of partitions referred to as "sublevels." Further, the phrase "level limiting" means that the user can define at what sublevel within a level change to limit the number of dots within a given level change although there are additional sublevels where more dots could be placed. The level limit may also be thought of as the percentage of ink coverage in a level change. Using the inventive level limiting capabilities of the present process, the amount of ink that is output by output device 50 is controlled to reduce over-saturation or extra ink being deposited on the media.

Once the dots for each pixel have been assigned to the various levels and sublevels as illustrated in step 54, computer 20 then outputs an image reproduction or color separation print 36 for each of the process colors at output device 50. Output device 50 may be capable of printing multiple levels or types of output. How the multi-level output data is processed for printing is discussed in more detail in co-pending application entitled "System and Method for Level Based Image Reproduction," U.S. patent application Ser. No. Ser. No. 09/414,390, filed on Oct. 7, 1999, and assigned to the same assignee as the present application. This co-pending application is hereby incorporated by reference in its entirety.

Although not depicted in FIG. 2, the digital processing may include optional color correction phases. Any color correction step typically involves displaying the image at monitor 47 (FIG. 1) so that it can be determined by the program user whether any of the separate colors need to be modified with respect to their color density as a result of any color distortion or change that occurred during input or as the continuous tone data was converted to the multi-level color values. If it is determined that color correction is necessary, a color correction setting may be input into processing unit 21 (FIG. 1) of computer 20. Methods of color correction are known in the art and are outside the scope of this application. One example of such a color correction technique is that identified in U.S. Pat. No. 5,175,804 issued to Whitman on Dec. 29, 1992, and is incorporated herein by reference.

Figure 3:
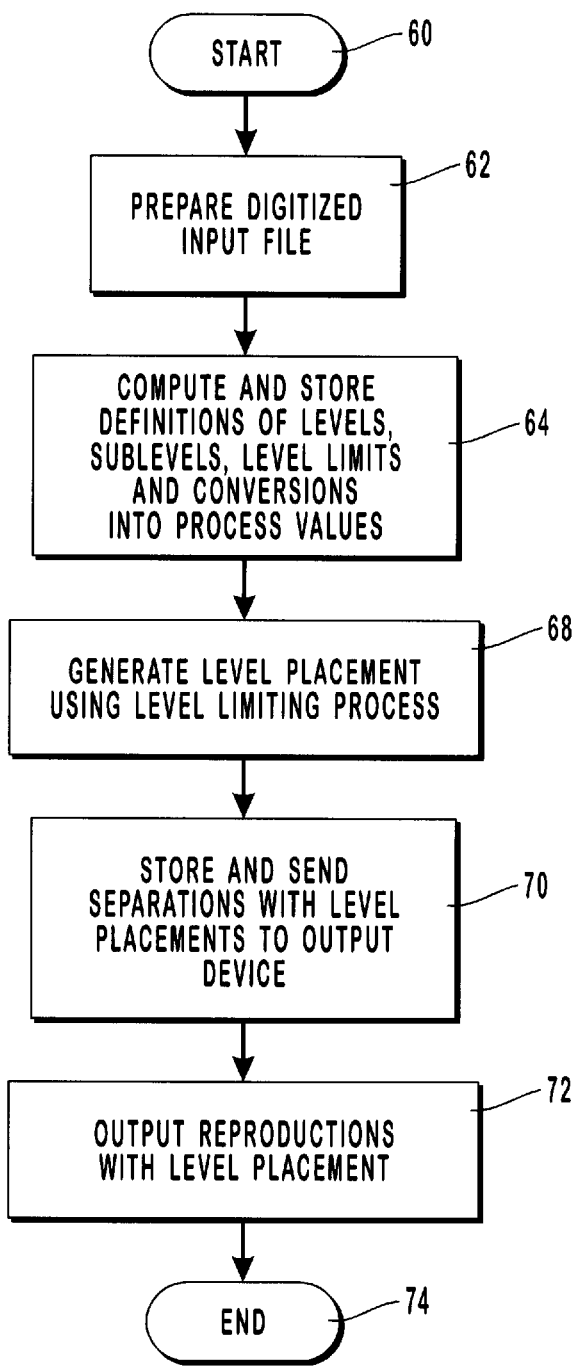
FIG. 3 is a flow chart that schematically illustrates one presently preferred embodiment of the method for color image reproduction utilizing the level limiting process in the digital computing system of FIG. 1.

One presently preferred embodiment of the overall method of image reproduction with level limiting is generally depicted in the flow chart of FIG. 3. As illustrated, the method starts at Step 60 with the system initialization with respect to the operating system of computer 20 and loading the program instructions for controlling processing unit 21 in accordance with the present invention into system memory 22.

Next, as represented at Step 62, image 51 is digitalized into an image file 52 if needed. In any case, image file 52 is input into the system. While the digitized file may take various forms, as previously mentioned, a digitized file is typically in the form of a conventional RGB file. It will be appreciated by those skilled in the art that the digitalized input file may also be in other formats than RGB including but not limited to CMYK, CMYK orange or green, hi-fi colors, or the like. Regardless of the particular data type, the image is defined in terms of a plurality of pixels. Each pixel is represented by an x-y coordinate position and an array of digital values $A[i,j]$ is prepared such that each value A in the array represents the density and placement of one of the colors from image 51 at each pixel. The continuous tone data in the image file is assigned a value A in the range of 0 to 255 for each of the RGB colors.

The method then advances to Step 64, where the levels, sublevels, and level limits are defined and stored. In addition, in Step 64 an entry array is calculated that will be used to convert the continuous data in image file 52 into multi-level color values. It is appropriate at this time to further discuss the concept of levels, sublevels and level limiting.

An example may be helpful in understanding the relationships between levels, sublevels, and level limiting.

Figure 4A:
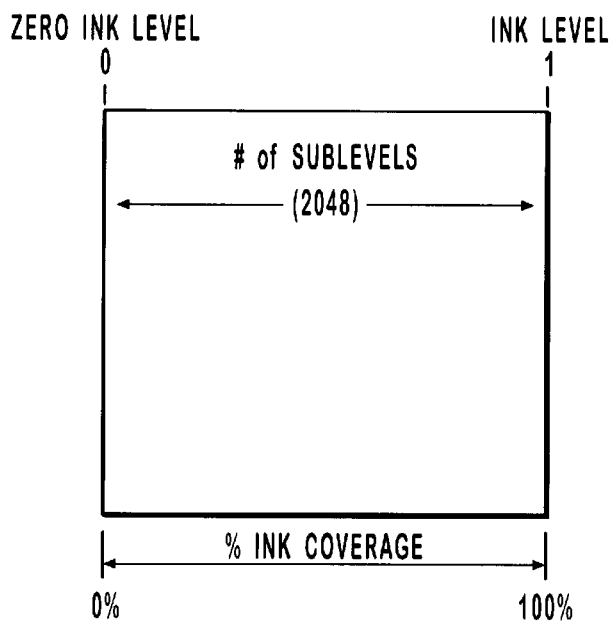
FIG. 4A is a schematic illustrating one embodiment of different types of levels.

FIG. 4A depicts one embodiment of a conventional half toning process. As illustrated, there are two types of output referred to as "levels." The levels shown in FIG. 4A are the zero ink level and the ink level. If each of the levels is examined in detail, the first level, labeled the zero ink level, is where no ink is placed by the printer for a particular pixel. The second level in this example is referred to as the ink level. In other words, in a conventional half toning process the ink is typically either on or off. Each level is typically assigned a value. It will be appreciated that various values could be used for the levels. By way of example and not limitation, in FIG. 4A it can be seen that the zero ink level has been arbitrarily given a value of 0. Likewise, the ink level has also been arbitrarily assigned a number, in this case of 1.

The change between the levels is referred to as a "level change." As a general rule, there is always one less level change than the number of levels. Accordingly, referring to FIG. 4A, it can be seen that there are two (2) levels, the zero ink level and the ink level, and one (1) level change. Each level change can be subdivided into a particular number of sublevels. By way of example and not limitation, the level change between the zero ink level and the ink level of FIG. 4A has been subdivided into 2048 sublevels. It will be appreciated by one skilled in the art that various other numbers of sublevels can be used.

When continuous tone data is conventionally converted into half tone data, the dots in the image are assigned to the sublevels. Each of the sublevels in the level change corresponds to a percentage of ink coverage. As indicated in FIG. 4A, at the sublevel of the level change that is located at the zero ink level, the percentage of ink coverage is zero. In contrast, the sublevel of the level change that is located at the ink level has an ink coverage percentage of 100%. When a specific percentage of ink coverage is required, this directly corresponds to the percentage of sublevels of the level change that are treated as being in the ink level. If, for example, it is specified that the percentage of ink coverage is to be 40%, 40% of the sublevels (i.e. (0.4×(2048)) or 819 sublevels) are treated as being in the ink level. Consequently, in this example, 40% of the sublevels are output as being in the ink level and are considered as being on. Correspondingly, the remaining 60% are in the zero ink level and are considered as being off.

Figure 4B:
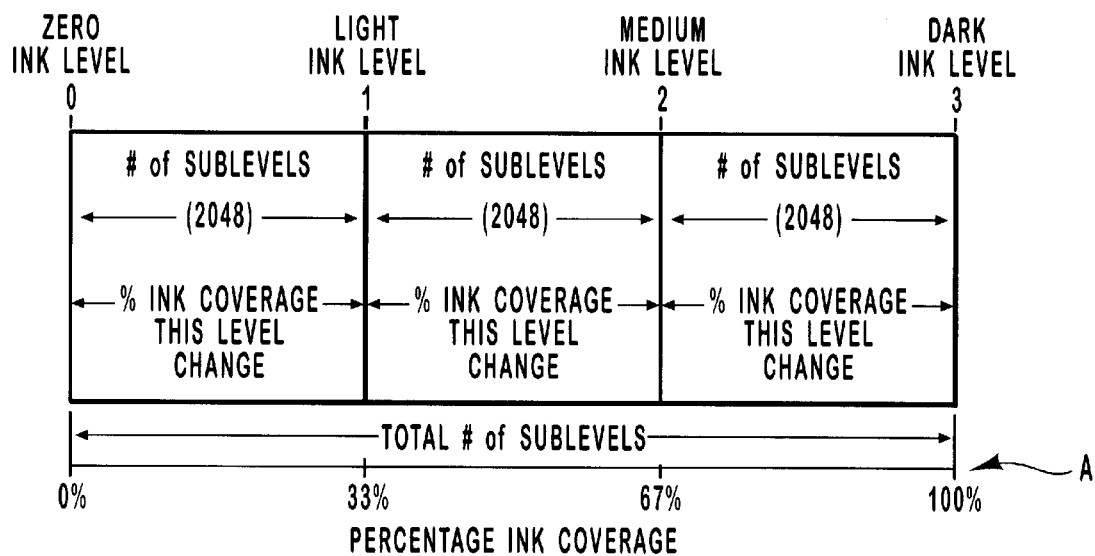
FIG. 4B is a schematic illustrating the concepts of levels, sublevels, and level limits.

FIG. 4B, depicts, by way of example and not limitation, one embodiment of multi-level processing that outputs data for four (4) types of ink output or levels. The four (4) levels depicted in this example are the zero ink level, the light ink level, the medium ink level, and the dark ink level. From this example, it can be seen that there are four (4) possible kinds of dots or output which correspond to four (4) levels. It will be appreciated that various other numbers of levels (or types of output) can be used. Again, each of the levels has arbitrarily been assigned a value. As previously discussed, different values could have been used for each of the levels. Referring to FIG. 4B, it can be seen that the zero ink level has a value of 0, and the light ink level has been assigned a value of 1. Likewise, the medium ink level and the dark ink level have been assigned the values of 2 and 3, respectively. Additionally, as can be seen from FIG. 4B, there are three level changes, the zero ink level to the light ink level (0 to 1), the light ink level to the medium ink level (1 to 2), and the medium ink level to the dark ink level (2 to 3).

Each of the level changes in FIG. 4B is subdivided into a number of sublevels. As illustrated, by way of example and not limitation, each of the three (3) level changes has been subdivided into 2048 sublevels. While in this example, the level changes have been divided into 2048 sublevels, various other numbers of sublevels can be used. Further, it will be appreciated that each level change is not required to have the same number of sublevels. However, as a general rule, a subsequent level change may not have fewer sublevels than the previous level change with one exception which is discussed in detail below.

When each level change is considered independently, the sublevels in a particular level chance have a percentage of ink coverage that ranges from 0% to 100%. For example, the level change from the zero ink level to the light ink level has a maximum percentage of ink coverage or dot placement at the light ink level where the percentage of ink coverage is 100%. Correspondingly, the level change from the zero ink level to the light ink level has a minimum ink coverage or dot placement of 0% at the zero ink level. Once a level change such as the zero ink level to the light ink level change reaches a 100% ink coverage, the dots are replaced by dots in the next level. Similarly, the level change from the light ink level to the medium ink level reaches 100% ink coverage at the medium ink level and a minimum of 0% ink coverage at the light ink level. Likewise, the level change from the medium ink level to the dark ink level reaches a maximum of 100% ink coverage at the dark ink level and a minimum of 0% at the medium ink level.

The four levels can be linearized onto an overall scale A as shown in FIG. 4B. The overall scale A is based on the total number of sublevels of all the level changes combined and is expressed a percentage of ink coverage. When the sublevels from the three (3) level chances are combined, each sublevel has a particular address. The address of a particular sublevel determines the particular type of output because it relates to a particular level. At 33% on overall scale A, the percentage of ink coverage in the level change from the zero ink level to the light ink level is at 100%. Correspondingly, at 67% on the overall scale A, the percentage of ink coverage in the level change from the light ink level to the medium ink level is at 100% ink coverage. Finally, at 100% on the overall scale A the percentage of ink coverage in the level change from the medium ink level to the dark ink level is at 100%. As illustrated by FIG. 4A, because the each of the level changes was subdivided into the same number of sublevels, when the three level changes were linearized onto the overall scale A, they were evenly sized and spaced. It will be appreciated, however, that this is not required and if the level changes are divided into differing numbers of sublevels they will not be the same size on the overall scale A.

Returning to the current FIG. 4B, what is happening in the processing is that at those sublevels up to 33% on the overall scale A, the pixel is considered to be filled with dots in the light ink level. Any value greater than 33% and up to 67% on the overall scale A, the light dots are replaced with dots in the medium ink level. Correspondingly, above 67% on the overall scale A, the medium dots are replaced with dots in the dark ink level.

Not only does the inventive method utilize multi-levels, as generally depicted in FIG. 4B, but enables the user to apply level limiting. Typically, a piece of paper or other type of media that the image is to be reproduced upon can accept only a certain amount of ink or percentage of ink coverage before the dots begin to grow, the media is saturated and causes the ink to run, or dark spots appear in the image. The present process allows the user to pick what is called a "level limit" and set the desired number of sublevels or percentage of sublevels that have dots placed in them as compared to all the sublevels in a particular level. As used herein, the phrase "level limit" means the percentage of ink coverage for a particular level. In addition, the level limit becomes the end of the level change during the linearization process and where the next level begins. The percentage of ink coverage or dot placement for a level change is calculated using the following formula: Level Limit %=(the desired number of sublevels within a level change/the total number of sublevels within the level change)×100. For simplicity, the level limit is discussed herein as a percentage and can be thought of as the percentage of ink coverage.

We are now prepared to consider multi-level processing with level limiting. In FIG. 4C, there are again depicted, by way of example and not limitation, four (4) levels or types of output: the zero ink level; the light ink level; the medium ink level, and the dark ink level. Like FIG. 4B, each of the level changes is subdivided into a number of sublevels. For ease, the sublevels in each of the level changes have again been, by way of example and not limitation, been set equal to 2048. It will be appreciated by those skilled in the art that various other numbers of sublevels could be utilized and that it is not required that the level changes have an equal number of sublevels.

Figure 4C:
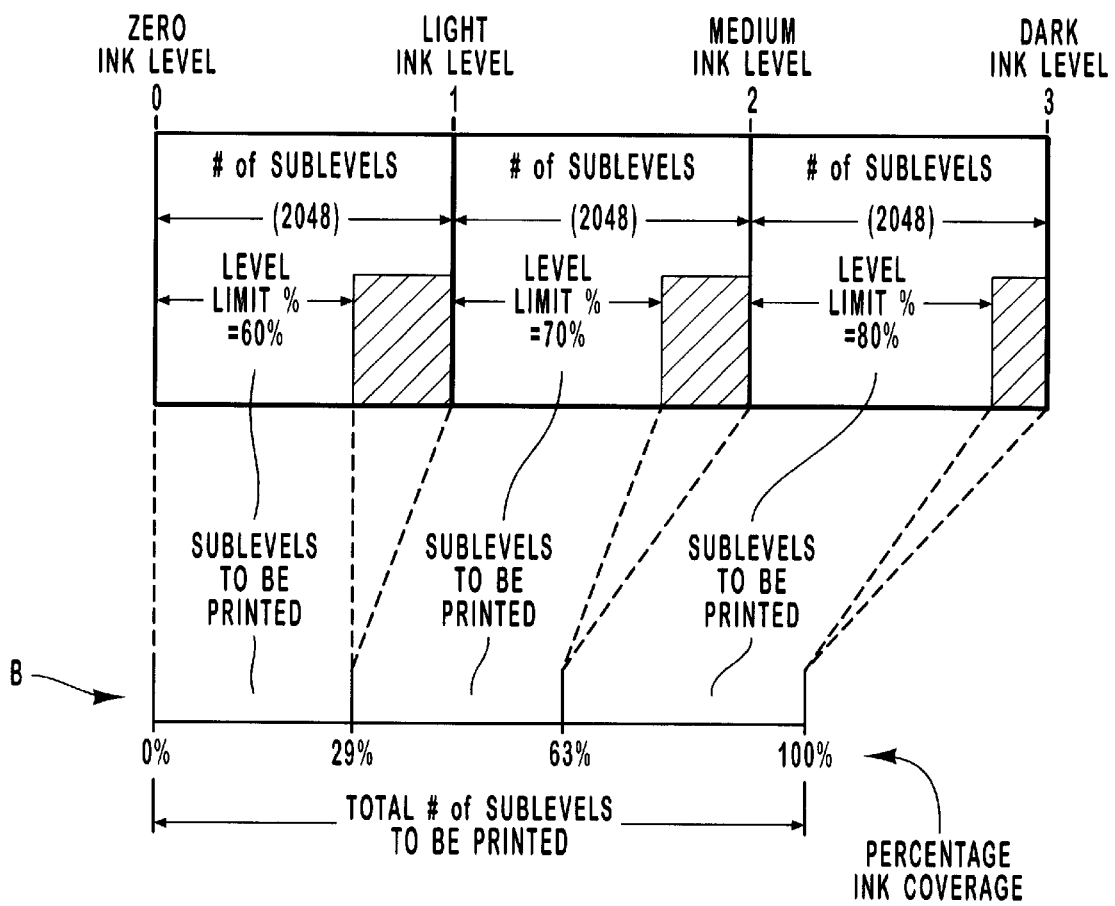
FIG. 4C depicts the linearization of the levels and level limits.

Referring to FIG. 4C, it can be seen that the level limits for each level change have been specified. The level limit for the level change between the zero ink level to the light ink level has been, by way of example only, set equal to 60%. Similarly, the level limits for the level changes between the light ink level and the medium ink level and the medium ink level and the dark ink level are, by way of example only, set equal to 70% and 80%, respectively. Again, it will be appreciated that various other level limits for the level changes could have been specified or that one or more of the level limits could have been set equal. Further, although the level limits depicted in FIG. 4C are increasing for each subsequent level change, it is not required that this be the case. By way of example only, all the level limits could be set equal. In addition, each level limit could be set below that of the previous level limit, with a limitation that will be discussed in further detail below. Finally, it will be appreciated by one skilled in the art that the level limits could be a combination of these examples.

Based on the level limits shown in FIG. 4C, in the level change from the zero ink level to the light ink level 60% of the sublevels have light ink in them. Similarly, in the level change from the light ink level to the medium ink level, 70% of the sublevels will be considered to be in the medium ink level, and in the level change from the medium ink level to the dark ink level, 80% of the sublevels will be considered to be in the dark ink level. The ability of the inventive process to allow the user to specify level limits allows the program to treat the level limit established for each level change as the point where 100% ink coverage is reached using the linearization process described below.

After establishing the levels, sublevels and level limits, it is now possible also in Step 64 to convert the values into process data. The process data can be stored in an entry array, also known as a look-up table, that is to be used later in the calculations and processing of input data into the multi-level output data. Storing the process data in the entry array is an optional step. Instead, a user could repeat the necessary calculations each time the process data is needed.

In one presently preferred embodiment, an entry array is used to separate the image data into levels and sublevels in each of the level changes. The entry array is basically a single array that is used to take the input pixel values to output values used in assigning sublevels and levels to pixels. The entry array is based on how may levels there are and the number of sublevels within each level change as well as the level limit for each level change. By using the entry array, the actual threshold value or sublevel address can be determined as well as what level to output. This process of constructing the entry array may be referred to as a linearization process that converts an input pixel value into output levels for processing the multi-level data. In one embodiment, the entry array is a function of the value of the current pixel, the background, this level, the next level, and the previous level limit. The background that is used in the array is either zero ink level or the previous level change that had one hundred percent (100%) coverage. It is only in those cases where it is the last level change or where the previous level change becomes the background because it has 100% coverage that the next level change may have fewer sublevels than the previous level.

As the entry array is built and the desired number of levels, sublevels, and level limits are specified, the CPU 26 maps or performs a linearization process on image file 52 that contains the input color values into a corresponding output pixel format. Accordingly, in Step 64, the continuous tone data for each of the levels is mapped using a linearization process onto an overall scale of 0–100% that is based on the total number of sublevels for each of the level changes that are within the level limits of all the level changes combined and is expressed as a percentage of ink coverage.

The mapping or linearization process, as illustrated in FIG. 4C, takes into account the level limits that have been set for each of the levels. Therefore, as the entry array is being calculated each level change is mapped during the linearization process so that the level limit becomes the point where the level is at 100% ink coverage. In other words, in this step the various level changes such as the level change from zero ink level to the light ink level of this example are mapped onto an overall scale B as illustrated in FIG. 4C. When the level limit of 60% coverage is reached for level change from the zero ink level to the light ink level the inventive process treats the light level as having 100% light ink coverage. Therefore, at the specified level limit, the process considers 100% of the ink for that level to be in place.

If FIG. 4C and particularly the overall scale B is examined in detail, it can be seen that the sublevels in each of the level changes that are above the specified level limits are ignored. Therefore, the overall scale B only includes the total sublevels that are printed. In addition, although the number of sublevels for each of the level changes was in this example set equal, because the level limits for the three (3) level changes were set to different percentages, different numbers of sublevels are being printed for each level change. Accordingly, the sublevels for the three (3) level changes are not in this case, evenly distributed on the overall scale B as they were in FIG. 4B.

Specifically, in this particular example, for the level change from the zero ink level to the light ink level, the level limit was set equal to 60% which corresponded to 60% of the sublevels being printed. Because in this example, the number of sublevels equalled 2048, this means that 1228 (60%×2048) sublevels will be printed. Similarly, for the level change from the light ink level to the medium ink level, the level limit was set equal to 70% and the number of sublevels was also equal to 2048. Accordingly, this means that in this example, 1433 (70%×2048) sublevels are printed in the level change from the light ink level to the medium ink level. Finally, in this example, the level limit for the level change from the medium ink level to the dark ink level was set equal to 80%. Correspondingly, the number of sublevels to be printed are 1638 (80%×2048).

FIG. 4C illustrates how the number of sublevels to be printed as is dictated by the level limits are linearized onto the overall scale B. The overall scale B is expressed in the percentage of ink coverage which correlates with the number of total number of sublevels to be printed. Continuing with this example, when all the sublevels to be printed from the three level changes are combined, this results in a total of 4299 sublevels being printed. As shown on overall scale B, the number of sublevels in the level change from the zero ink level to the light ink level are 29% of the total sublevels printed. At those sublevels 29% and below on the overall scale B, the pixel is considered to be filled with dots from the light ink level. Continuing with the current example illustrated in FIG. 4C, at 29% on overall scale B, the level change between the zero ink level and the light ink level is at 100%. Remembering, however, that because of the level limit that was previously set by the user, what is being called 100% ink coverage for this level change in FIG. 4C is really, in this example, 60% of the possible sublevels in the level change between the zero ink level and the light ink level as shown in FIG. 4C.

On the overall scale B, the sublevels from the level change between the light ink level to the medium ink level are those above 29% to 63% which corresponds to 34% of the total printed sublevels. Correspondingly, at 63% on the overall scale B, level change between the light ink level and the medium ink level is at 100% ink coverage. As with the previous level change, what is being called 100% ink coverage for this level change is really, in this example, 70% of the possible sublevels in the level change between the light ink level and the medium ink level. In any sublevel in the range above 29% through 63% the light dots are replaced with dots from the medium ink level. Finally, the sublevels from the level change between the medium ink level to the dark ink level are those sublevels on the overall scale B above 63% and up to 100% which corresponds to 37% of the total number of printed sublevels. Finally, at 100% on the overall scale B the level change between the medium ink level and the dark ink level is at 100%. As with the other level changes what is being called 100% ink coverage for this level change is really 80% of the possible sublevels. Correspondingly, above 63% on the overall scale B the medium dots are replaced with dots from the dark ink level. As shown by the dotted lines in FIG. 4C, the sublevels that are above the respective level limits in each of the level changes are ignored during the linearization process for multi-level processing with level limits.

The method now proceeds to Step 68 where CPU 26 continues with digital processing in order to generate the level placement using the multi-level processing with level limiting. As previously discussed and as used herein, the phrase "level limiting" means that the amount of ink coverage is controlled in such a way that the desired color is obtained but problems of dot growth or over saturation of the medium is avoided by limiting the output, such as the amount of ink deposited on the medium. In addition, the quality and clarity of the image is improved. The specifics of Step 68 will be discussed in further detail below. Once the data has been processed into the multi-levels with level limiting, in Step 70 the data can be stored or sent as color separations to the output device. Now, color composite reproductions using color separations can be output as indicated at Step 72. Thus, concluding the overall method is indicated in Step 74.

Figure 5:
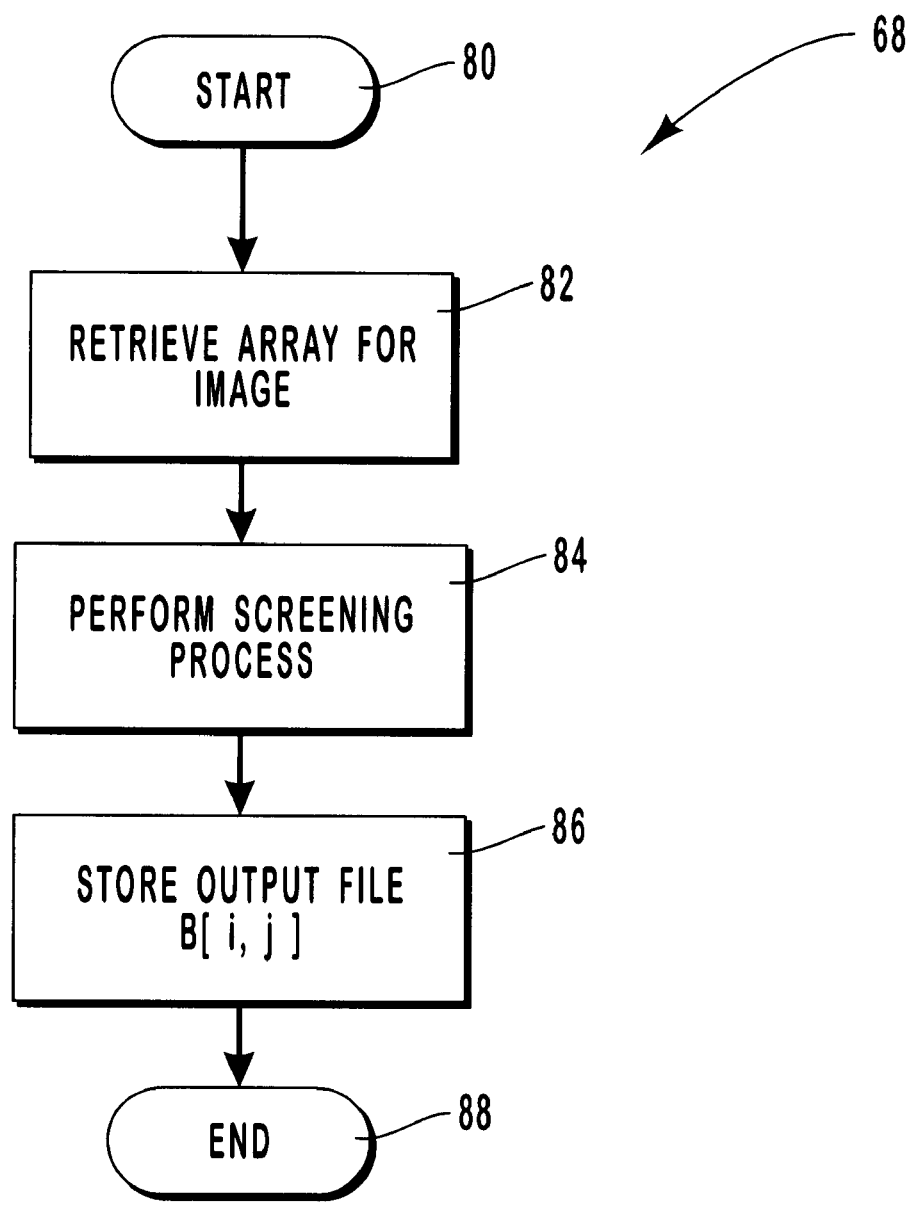
FIG. 5 is a flow chart that schematically illustrates in additional detail from FIG. 3 one presently preferred method of color image reproduction using the process for multi-level processing level limiting.

FIG. 5 illustrates in greater detail the innovative processing of the present invention which is employed for the step in FIG. 3 generally designated as 68 for generating level placement using the level limiting process. Step 68 allows the inventive method to control the different types of output and different amounts of ink that are placed on the media by the printer. As a result of the ability of the inventive method to process multi-levels with level limiting, the amount of ink output by the pinter is controlled so that excess ink is not placed on the media, the media is not saturated, and the quality and clarity of the image is improved.

As illustrated in the flow chart of FIG. 5, the method used to perform Step 68 begins at Step 80 and is followed at Step 82 by retrieving the arrays for the image. As one skilled in the art will appreciate, and as previously mentioned, the arrays A[i,j] for the image were input into CPU 26. The process advances to Step 84 to process the data for the image through a screening process to establish the levels, sublevels, and apply the level limits. Various screening processes have been developed. The different embodiments of a screening process of the present invention will be discussed in further detail below.

Upon completion of the screening process, regardless of the particular embodiment that is used, an output array B[i,j] has been created that contains the information regarding the multi-level information for each pixel in each of the color separations that will be used by the printer. The output array B[i,j] for each pixel is electronically stored in Step 86. The method then terminates as shown at Step 88.

Figure 6:
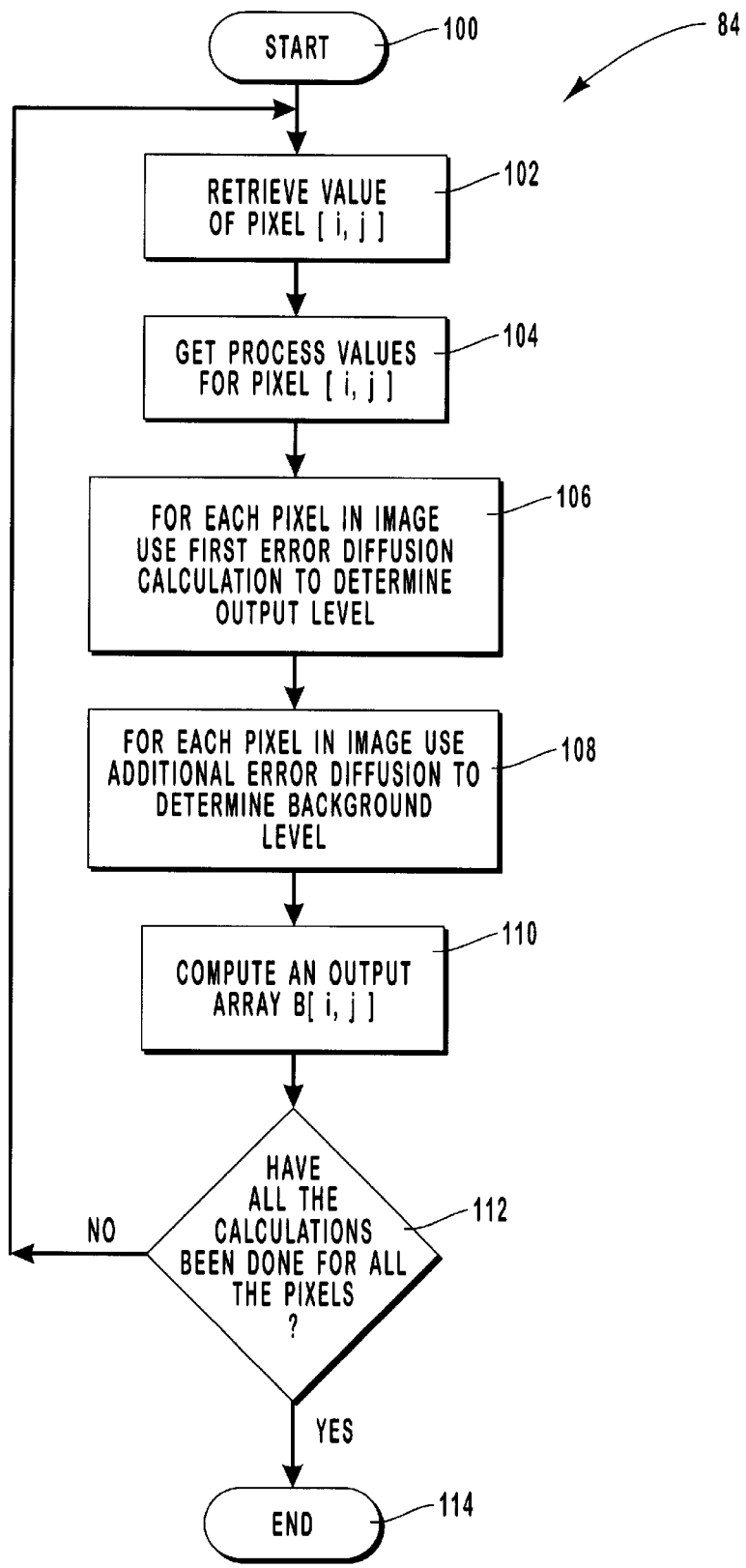
FIG. 6 is a flow chart that schematically illustrates in additional detail from FIG. 5, one embodiment of a screening process for multi-level processing with level limiting.

As previously mentioned, various types of screening processes can be used in Step 84. One of the presently preferred screening processes is an error diffusion process that is generally depicted in FIG. 6. As an overview, this error diffusion process operates off many of the basic principles discussed in detail in U.S. Pat. No. 5,175,804 issued to Whittmann on Dec. 29, 1992, and accordingly the discussion of the principles of the error diffusion processing is incorporated herein by reference.

As depicted in FIG. 6, one embodiment of the method of performing Step 84 of a screening process to generate level placement begins at Step 100. The process proceeds to Step 102 where the value of the pixel [i,j] is retrieved. As one skilled in the art will appreciate, and as previously mentioned, the arrays A[i,j] for the image were derived by digitally processing each of the input data arrays that were input into CPU 26. In Step 104, the process values established in Step 64 (FIG. 3) for processing with level limits is compared to the level limits are obtained. As previously discussed, the process values could have optionally been stored in an entry array built in Step 64. In either case, the process values from Step 64 are either retrieved from an entry array or re-calculated in step 104.

Next, in Step 106 for each pixel in the image, an array $E_1[i,j]$ is computed using a first set of error diffusion calculations to determine the output level for a particular pixel [i,j]. Once the first error diffusion calculations have been completed for a pixel, the inventive process continues and immediately begins in Step 108, where additional error diffusion calculations are performed to determine the background level of a particular pixel [i,j]. Therefore, in one presently preferred embodiment illustrated in Step 108, for each pixel in the image, an array $E_2[i,j]$ is computed. The inventive process now computes output array B[i,j] which contains the multi-level information with level limiting. In Step 112 the inventive process determines whether all the data for each pixel has been processed through the error diffusion calculations in Steps 106 and 108. If there are additional pixels values that have not been done, the method then returns to Step 102. If all the pixels have been completed, the method ends at Step 114.

Figure 7:
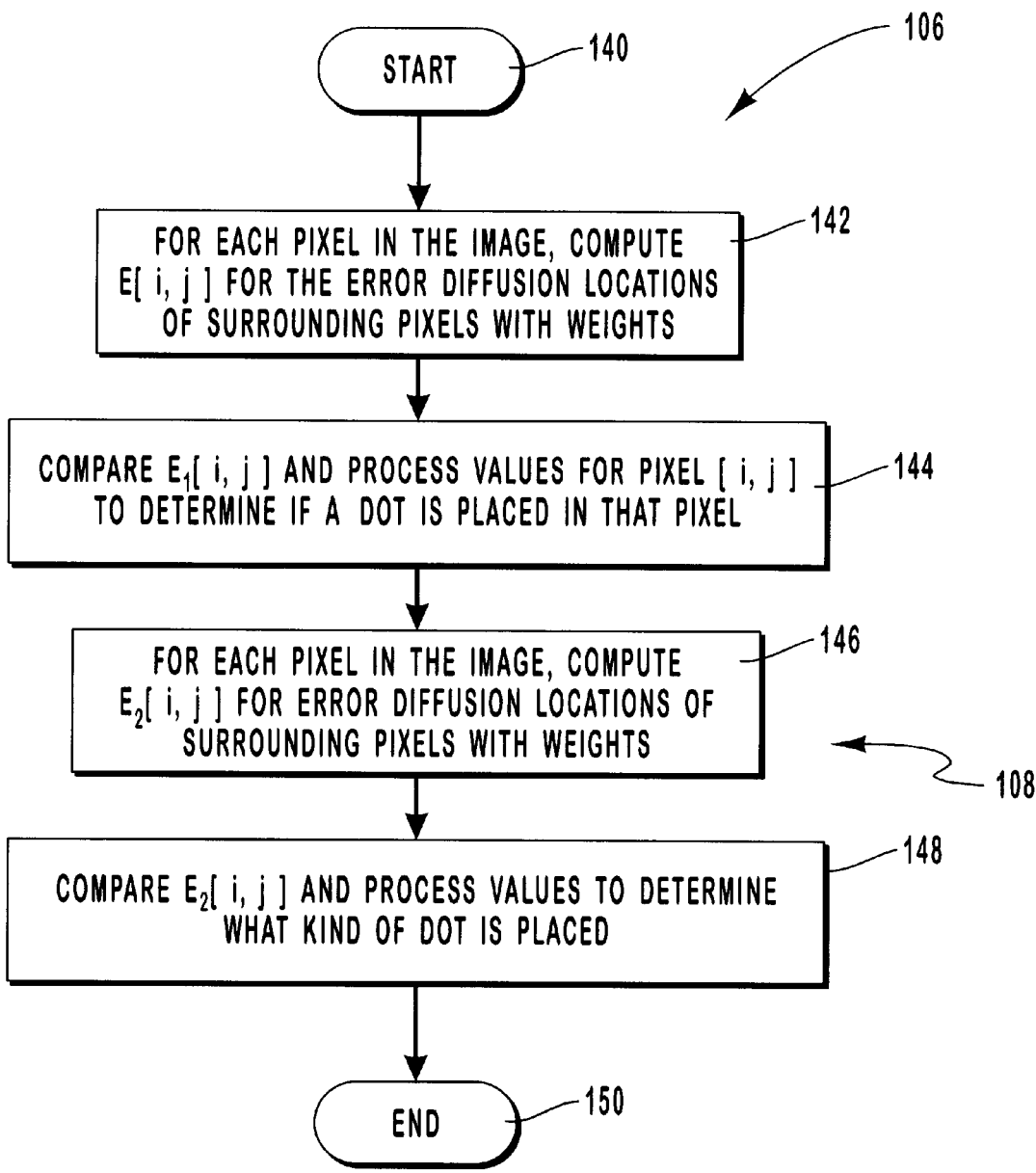
FIG. 7 is a flow chart that schematically illustrates in additional detail from FIG. 6, one embodiment of a screening process that uses error diffusion calculations for multi-level processing with level limiting.

FIG. 7 depicts in further detail the processes for completing the modified error diffusion calculations of Steps 106 and 108 that are illustrated generally in FIG. 6. In this embodiment, the inventive process using the multiple error diffusion calculations begins with the Step 140 and continues to Step 142 where for each pixel in the image, the array $E_1[i,j]$ is computed for the error diffusion locations for a plurality of surrounding pixels. The computations include assigning weight factors for each of the surrounding pixels. It will be appreciated by one skilled in the art that various methods of assigning weights to the surrounding pixels may be utilized. The method continues to Step 144 where the error calculated in Step 144 for the current pixel is compared to the process values for pixel [i,j] that were established in Step 64 to determine if a dot is placed in that particular pixel.

The inventive process enters into the second set of error diffusion calculations by proceeding to Step 146 where for the current pixel, an array $E_2[i,j]$ is computed for the error diffusion locations for a plurality of surrounding pixels. The computations again include assigning weight factors for each of the surrounding pixel. The method continues to Step 148 where the error calculated in Step 146 for the current pixel is again compared to the process value established in Step 64 this time to determine what type of dot is placed in that particular pixel. The inventive method continues to Step 150 where it terminates.

It will be appreciated that any number of sets of error diffusion calculations could be used. The number of additional error diffusion calculations used in this embodiment of the screening process dictates the number of levels and level changes that can be used. As a general rule, the number of level changes may only be one (1) more embodiment of a screening process. By way of example and not limitation, two sets of error diffusion calculations, the process is limited to three level changes and four levels, such as those depicted in FIG. 4C. Where two sets of error diffusion calculations are used, number of levels that can make up the background is limited to two. It is important to remember that the second set of error diffusion calculations is used to determine the the background for that pixel.

The advantage of multiple error diffusion methods arranged as illustrated in FIG. 7 is the ability to output multiple levels. The use of multiple sets of error diffusion calculations overcomes the shortcomings of using a single error diffusion in which the pixel was either on or off. Now, using the multiple diffusion methods, the data can be processed into multiple levels corresponding to multiple types of output. Further, many of the problems such as over saturation, dark spots and clarity, are solved by the use of the multi-level data with level limiting. In the present inventive method, both calculations from the multiple error diffusion calculations are used to determine the level, the sublevel within the level, and utilize level limiting.

Figure 8:
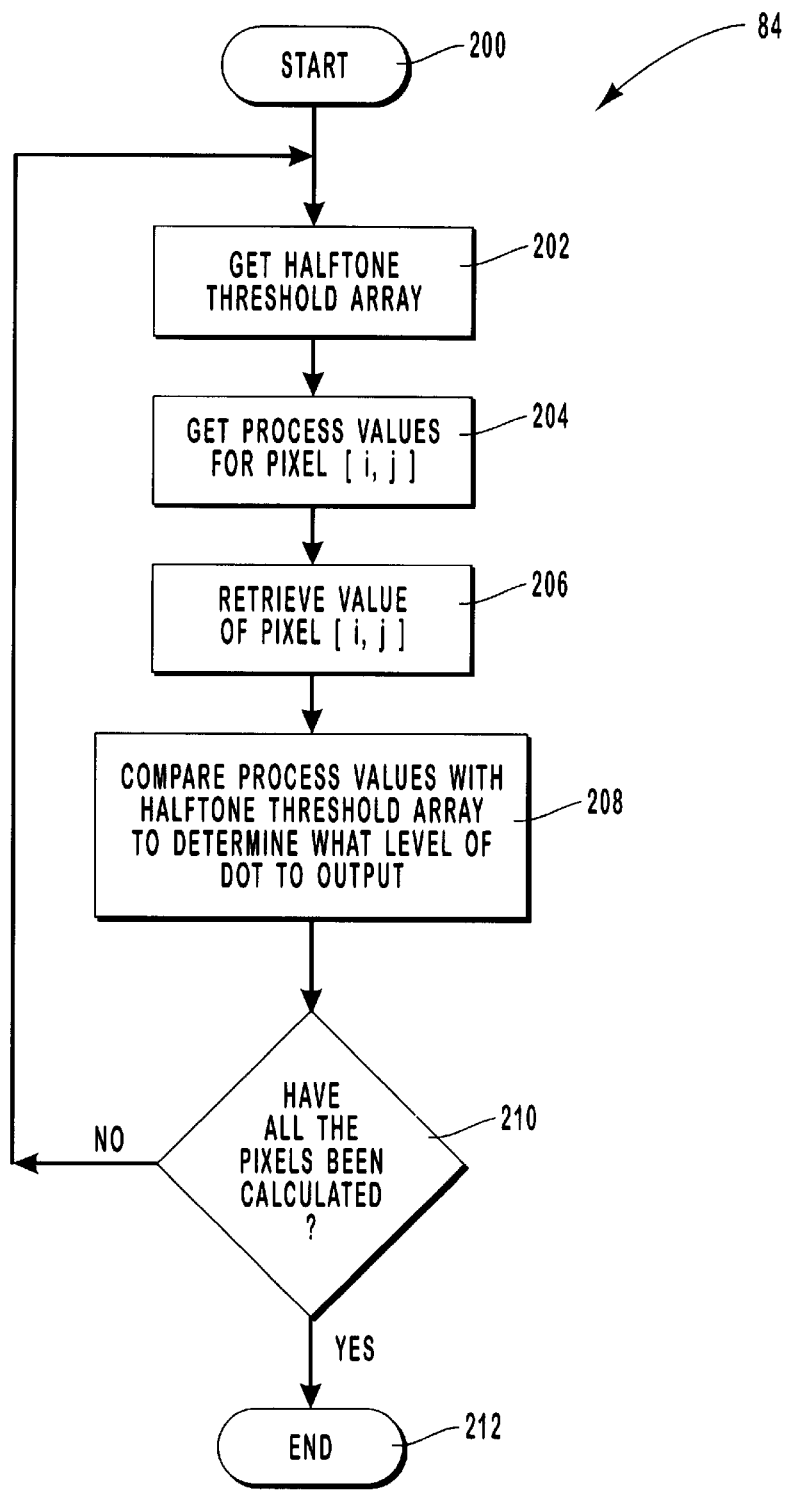
FIG. 8 is a flow chart that illustrates in additional detail from FIG. 5, an alternate embodiment of a screening process for multi-level processing with level limiting.

FIG. 8 depicts an alternate method of performing, the screening process illustrated in FIG. 5 as Step 84 that establishes the various levels with level limits using a half-tone threshold array. In this embodiment of a screening process, the method for performing Step 84 begins with Step 200 and continues on to Step 202 where a half-tone threshold array is retrieved. Half-tone threshold arrays are well known in the art and will not be discussed in further detail here. After the half-tone threshold array is retrieved in Step 202, the method proceeds to Step 202 where the value of the pixel [i,j] is retrieved. As one skilled in the art will appreciate, and as previously mentioned, the arrays A[i,j] for the image were derived by digitally processing each of the input data arrays that were input into CPU 26. Next, in Step 204, the process values established in Step 64 (FIG. 3) for processing with level limits are compared to the level limits are obtained. As previously discussed, the process values could have optionally been stored in an entry array built in Step 64. In either case, the process values from Step 64 are either retrieved from an entry array or re-calculated in Step 204.

As illustrated in FIG. 8, the method continues to Step 208 where the process values are compared with the half-tone threshold array value at [i,j] to determine what level of dot to output. The method then advances to Step 210 where it is determined whether there is another pixel. If so the method returns to Step 204. If not, the method ends at Step 212.

Figure 9:
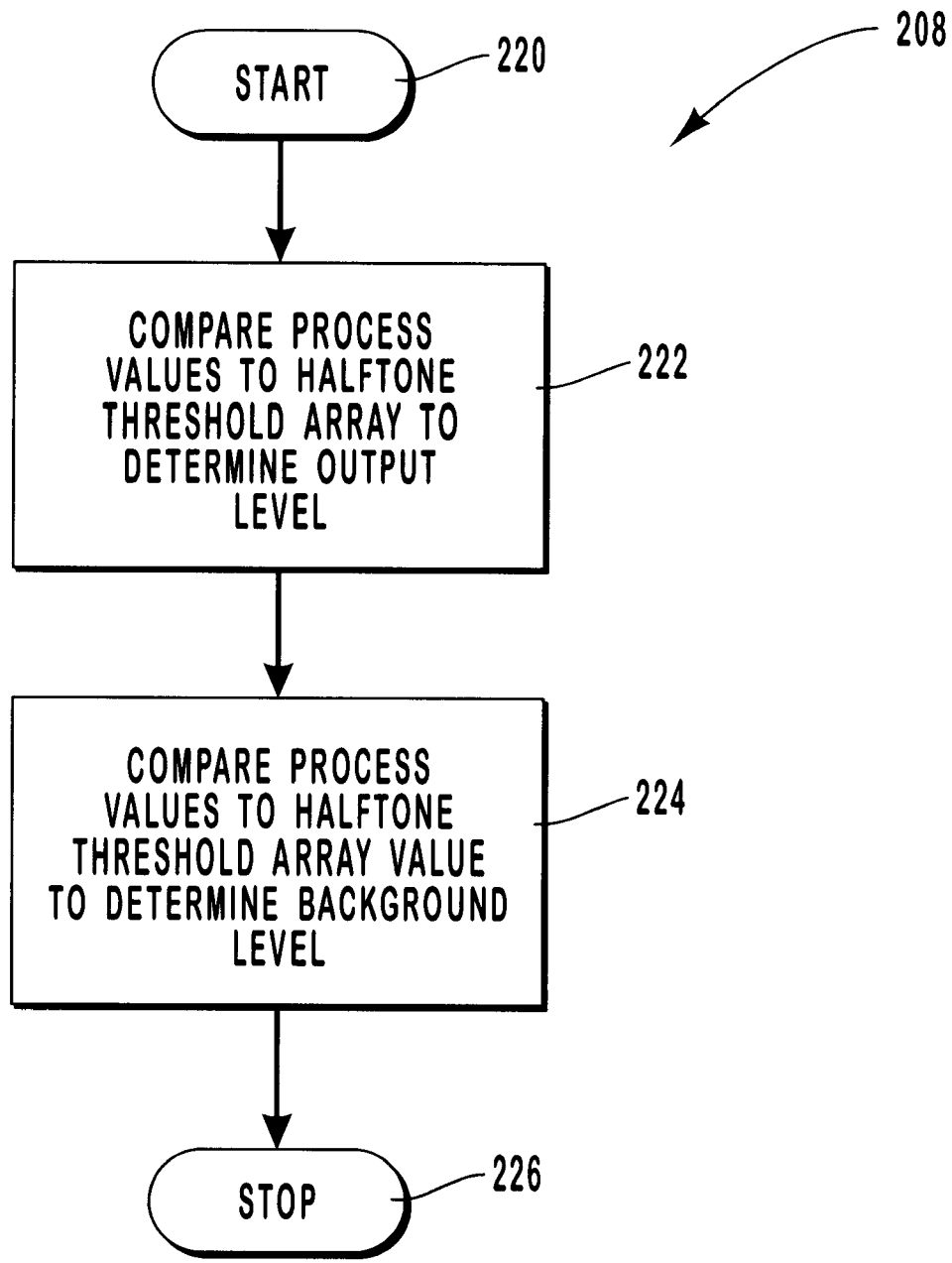
FIG. 9 is a flow chart that illustrates in additional detail from FIG. 8, one embodiment for comparing process values with a halftone threshold array to determine what level of dt to output.

FIG. 9 depicts the process shown generally as Step 208 in FIG. 8. The method for performing the Step 208 begins at Step 220 and continues to Step 222. In Step 222 the process values are compared to the half-tone threshold array value to determine the output level for a particular pixel [i,j]. Next, in Step 224 the process values are compared to the half-tone threshold array value to determine the background level for a particular pixel [i,j]. The process then continues to Step 226 where it terminates.

The present invention allows image data to be processed into multiple levels and to limit the percentage of ink coverage of the various levels, thereby improving the image that is produced and can be used to save printing time. With this process, we are no longer left with the printer dots merely being on or off. Now we can do any number of levels.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system capable of digitizing a continuous tone color image, a method of reproducing the color image on a media while controlling an amount of ink that is placed on the media, the method comprising steps for:

creating an input file of digital image data containing information corresponding to density and placement of the colors for each pixel contained in said image;

determining one or more levels for each pixel of the digital image data, wherein each of the one or more levels includes one or more sub-levels and each of the one or more levels includes a level limit;

converting the digital image data into multi-level color values with level limiting such that the multi-level color values correspond to the one or more sub-levels of each level that are below the level limit of each level, wherein the multi-level color values that correspond to sub-levels of each level that are above the level limit of each level are ignored;

digitally processing said multi-level color values so as to initially derive therefrom output values of each pixel; and preparing from said output values a color image.

2. A method as defined in claim 1, wherein said input file comprises RGB data.

3. A method as defined in claim 1, wherein said step of digitally processing said multi-level color values so as to initially derive therefrom output values of each pixel further comprises steps for:

performing a first set of first error diffusion calculations for all pixels in said image; and performing at least a second set of error diffusion calculations for all pixels in said image.

4. A method as defined in claim 1, wherein said step of digitally processing said multi-level color values so as to initially derive therefrom output values of each pixel further comprises a step for using a threshold array to determine the level and sublevel of each pixel.

5. A method as defined in claim 1, wherein the step for converting the digital image data into multi-level color values further comprises a step for applying said level limit of each level to said input data.

6. A computer readable medium having computer executable instructions for performing the steps recited in claim 1.

7. A method of reproducing an image from a continuous tone image that has been digitized into one or more pixels while contolling an amount of ink that is used to reproduce the image, the method comprising steps for:

generating one or more levels for the continuous tone image, wherein each of the one or more levels has one or more sublevels and each of the one or more levels has a level limit, wherein at least some of the one or more sublevels in each level are below the level limit of each corresponding level;

processing the one or more pixels such that each of said pixels is associated with one of the one or more sublevels of a particular level; and for each pixel that is associated with a sub level that is below the level limit, causing a dot placement to be placed on a media, wherein dot placements for each pixel that is associated with a sublevel that is above the level limit of each level are not placed on the media.

8. A method as defined in claim 7, wherein each of said levels represents a particular type of output to be placed on said media.

9. A method as defined in claim 7, wherein each of said steps is repeated for each color in a color scheme.

10. A computer-readable medium having computer-executable instructions for performing the steps recited in claim 7.

11. In a system including an image, a method of image reproduction while limiting an amount of ink used to reproduce the image on a media, the method comprising acts of:

inputting an image containing a plurality of colors, said image being defined by a plurality of pixels;

creating a first array of digital values representing the density and placement of the continuous tone colors contained in each pixel of said image;

deriving a separate array of digital values from the first array of digital values using level limits, the separate array of digital values representing the density and placement of multi-level values that represent each of said pixels of said image, wherein the separate array of digital values ignores multi-level values above the level limits;

generating level and sublevel assignments in output arrays for each of said plurality of pixels from the separate array of digital values; and preparing said output arrays for each of said colors of said image.

12. A method as recited in claim 11, further comprising following the act of generating level and sublevel assignments in output arrays, an act of applying level limiting to said pixels in said sublevels in said level.

13. A method as recited in claim 12, wherein said act of generating level and sublevel assignments in output arrays further comprises an act of determining which of said levels each of said pixels is in.

14. A method as recited in claim 12, wherein the act of generating level and sublevel assignments in output arrays further comprises acts of:

digitally processing each of said separate array for each multi-level value so that for each pixel a separate first error diffusion array is generated for a plurality of surrounding pixels;

further digitally processing said error diffusion array so as to assign a weight value to each of said plurality of surrounding pixels, each of said weight values being dependent upon the relative position of said surrounding pixels of which said error diffusion array was determined; and deriving from said weight values and said error diffusion array for each of said color a first error output array which defines said level and sublevel of a corresponding pixel of said image.

15. A method as recited in claim 14, further comprising acts of:

digitally processing each of said first error arrays for each pixel so that for each pixel at least a separate second error diffusion array is generated for a plurality of surrounding pixels;

further digitally processing of said second error diffusion array so as to assign a weight values to each of said plurality of surrounding pixels, each of said weight values being dependent upon the relative position of said surrounding pixels of which said second error diffusion array was determined; and deriving from said weight values and said second error diffusion array for each of said color an output array which defines said level for a corresponding pixel of said image.

16. A method as recited in claim 11, further comprising acts of:

digitally processing said separate array for each multi-level value through a half-tone threshold array; and deriving from said threshold array said output array of each pixel, wherein each of said output array defines said level and sublevel for a corresponding pixel of said image.

17. In a system including an image that is reproduced on a media, wherein excessive ink on the media reduces a quality and clarity of the image by causing, for example, dot growth or media saturation, a method for limiting an amount of ink placed on the media while reproducing the image on the media, the method comprising acts of:

preparing an image array from the image, wherein the image array contains continuous tone data of the image;

defining one or more levels for the continuous tone data, wherein each level includes one or more sublevels and a level limit;

mapping the continuous tone data into a scale, wherein the scale is based on the one or more sub levels of each level that are below the level limit of each level, wherein the one or more sub levels included in the scale is less than the one or more sub levels included in all the levels; and generating level placements from the scale such that sublevels above the level limit of each level are ignored and the amount of ink placed on the media is controlled when the image is reproduced on the media by only placing ink for the sublevels of each level that are included in the scale.

18. A method as defined in claim 17, wherein the act of defining one or more levels for the continuous tone data further comprises an act of screening the image array.

19. A method as defined in claim 17, wherein the act of screening the image array further comprises at least one of the acts of:

for each pixel in the image array generating a first error diffusion array for a plurality of surrounding pixels to determine an output level of each pixel; and for each pixel in the image array, generating a second error diffusion array to determine a background level of each pixel; and determining an output level for each pixel using a halftone threshold array.

* * * * *

UNITED STATES PATENT AND TRADEMARK OFFICE
CERTIFICATE OF CORRECTION

PATENT NO. : 6,344,903 B1
DATED : February 5, 2002
INVENTOR(S) : Maxim Wasyl Derhak and Bobby Dee Hartly It is certified that error appears in the above-identified patent and that said Letters Patent is hereby corrected as shown below:

Column 4,
Line 25, change "dt" to -- dot --

Column 5,
Line 56, change "an" to -- and --

Column 6,
Line 1, before "pointing" insert -- a --
Line 57, after "digitalized" insert -- to --
Line 57, change "is" to -- as --

Column 7,
Line 48, before "09/414,390" delete "Ser. No."

Column 9,
Line 63, after "expressed" insert -- as --

Column 10,
Line 1, change "change" to -- changes --

Column 12,
Line 46, after "level" insert -- that --

Column 15,
Line 41, after "limits" insert -- that --

Column 16,
Line 6, after "changes" insert -- , --
Line 8, after "claims" insert -- . --

UNITED STATES PATENT AND TRADEMARK OFFICE
CERTIFICATE OF CORRECTION

PATENT NO.   : 6,344,903 B1
DATED        : February 5, 2002
INVENTOR(S)  : Maxim Wasyl Derhak and Bobby Dee Hartly It is certified that error appears in the above-identified patent and that said Letters Patent is hereby corrected as shown below:

<u>Column 18,</u>
Line 6, after "assign" delete "a"

Signed and Sealed this

Thirtieth Day of March, 2004

JON W. DUDAS
*Acting Director of the United States Patent and Trademark Office*